United States Patent
Mancini et al.

(10) Patent No.: US 9,061,476 B2
(45) Date of Patent: *Jun. 23, 2015

(54) PROCESS AND APPARATUS FOR ASSEMBLING TYRES

(75) Inventors: Gianni Mancini, Milan (IT); Maurizio Marchini, Milan (IT); Michele Ballabio, Milan (IT); Stefano Boracco, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 595 days.

This patent is subject to a terminal disclaimer.

(21) Appl. No.: 12/988,050

(22) PCT Filed: Apr. 17, 2009

(86) PCT No.: PCT/IB2009/051600
§ 371 (c)(1),
(2), (4) Date: Jan. 3, 2011

(87) PCT Pub. No.: WO2009/128046
PCT Pub. Date: Oct. 22, 2009

(65) Prior Publication Data
US 2011/0108187 A1     May 12, 2011

(30) Foreign Application Priority Data
Apr. 18, 2008   (WO) .................. PCT/IB2008/051501

(51) Int. Cl.
*B29D 30/20*      (2006.01)
*B29D 30/26*      (2006.01)

(52) U.S. Cl.
CPC ............ *B29D 30/20* (2013.01); *B29D 30/2607* (2013.01); *B29D 2030/202* (2013.01)

(58) Field of Classification Search
CPC ............... B29D 30/0016; B29D 30/20; B29D 30/2607; B29D 30/3014; B29D 2030/202
USPC .............. 156/111, 126, 127, 128.1, 293, 396, 156/415, 417
See application file for complete search history.

(56) References Cited

U.S. PATENT DOCUMENTS

| 2,028,078 A | 1/1936 | State et al. |
| 2,818,907 A | 1/1958 | Sapp |

(Continued)

FOREIGN PATENT DOCUMENTS

| CN | 101011862 A | 8/2007 |
| CN | 101011863 A | 8/2007 |

(Continued)

OTHER PUBLICATIONS

Machine-generated English language translation of JP 2006-142584 (original document dated Jun. 2006).*

(Continued)

*Primary Examiner* — Martin Rogers
(74) *Attorney, Agent, or Firm* — Finnegan, Henderson, Farabow, Garrett & Dunner, L.L.P.

(57) ABSTRACT

In an assembly station, a carcass sleeve and an outer sleeve manufactured along respective building lines are mutually coupled. Integrated into the assembly station are engagement devices that can be alternatively-coupled to an auxiliary drum carrying an outer sleeve and to a building drum carrying a carcass sleeve. The building drum is engaged on the assembly station before removal of the auxiliary drum. A grip unit picks up the outer sleeve from the auxiliary drum associated with the engagement devices in order to position it around the carcass sleeve carried by the building drum.

24 Claims, 5 Drawing Sheets

(56) References Cited

U.S. PATENT DOCUMENTS

| | | | |
|---|---|---|---|
| 3,687,756 A * | 8/1972 | Appleby et al. | 6/111 |
| 3,922,187 A * | 11/1975 | De Nardis | 156/415 |
| 4,093,495 A * | 6/1978 | Colombani | 156/394.1 |
| 4,314,864 A * | 2/1982 | Loeffler et al. | 156/111 |
| 4,362,592 A * | 12/1982 | Ruppel | 156/402 |
| 4,449,866 A * | 5/1984 | Lohneis et al. | 408/9 |
| 4,474,399 A | 10/1984 | Lauber | |
| 4,732,640 A * | 3/1988 | Goodfellow | 156/396 |
| 4,798,647 A * | 1/1989 | Haas | 156/414 |
| 4,854,612 A * | 8/1989 | Cubric et al. | 285/18 |
| 5,051,149 A * | 9/1991 | Ishii | 156/403 |
| 5,099,684 A * | 3/1992 | Okamoto | 73/146 |
| 5,174,585 A * | 12/1992 | Erkki | 279/2.08 |
| 5,175,914 A * | 1/1993 | Mitsukuchi et al. | 29/27 C |
| 5,354,404 A * | 10/1994 | Benjamin | 156/362 |
| 6,328,084 B1 | 12/2001 | Caretta et al. | |
| 2004/0261934 A1 | 12/2004 | Nakata et al. | |
| 2005/0224159 A1 * | 10/2005 | Suda et al. | 156/123 |
| 2006/0144500 A1 | 7/2006 | Lacagnina | |
| 2007/0074482 A1 | 4/2007 | Van Gelder | |
| 2007/0175567 A1 | 8/2007 | Stahl | |
| 2009/0160096 A1 * | 6/2009 | Currie et al. | 264/334 |

FOREIGN PATENT DOCUMENTS

| | | | | |
|---|---|---|---|---|
| EP | 0 104 338 A1 | | 4/1984 | |
| EP | 1 312 462 A1 | | 5/2003 | |
| EP | 1 481 791 A2 | | 5/2004 | |
| EP | 1 481 791 A2 | | 12/2004 | |
| EP | 1 491 324 A2 | | 12/2004 | |
| JP | 60-220736 | * | 11/1985 | B29D 30/36 |
| JP | 2006-21495 | * | 1/2006 | B29D 30/32 |
| JP | 2006-142584 | * | 6/2006 | B29D 30/32 |
| JP | 2006-248163 | * | 9/2006 | B29D 30/32 |
| RU | 2009 130 957 A | | 2/2011 | |
| WO | WO 02/094545 | * | 11/2002 | B29D 30/00 |
| WO | WO 2004/041521 A1 | | 5/2004 | |
| WO | WO 2006/064526 A1 | | 6/2006 | |
| WO | WO 2007/074482 A1 | | 7/2007 | |
| WO | WO 2008/099363 | * | 8/2008 | B29D 30/24 |

OTHER PUBLICATIONS

English translation of JP 60-220736 (oroginal document dated Nov. 1985).*

Machinr-generated English language translation of JP 2006-248163 (original document dated Sep. 2006).*

Machine generated English language translation of JP 2006-021495 (original document dated Jan. 2006).*

Machine generated English language translation of JP 2006-248163 (original document dated Sep. 2006).*

English language translation of JP 60-220736 (original document dated Nov. 1985).*

Office Action issued in corresponding Chinese Patent Application No. 200980119915.1, from the Chinese Patent Office dated Oct. 10, 2012, 10 pages.

International Search Report from the European Patent Office for International Application No. PCT/IB2009/051600 mailed Sep. 15, 2009.

Decision on Grant from the Russian Federation, issued in corresponding Application No. 2010146973/05(067833), dated Jan. 11, 2013, 23 pages.

* cited by examiner

PROCESS AND APPARATUS FOR ASSEMBLING TYRES

CROSS REFERENCE TO RELATED APPLICATIONS

This application is a national phase application based on PCT/IB2009/051600, filed Apr. 17, 2009, and claims the priority of international application no. PCT/IB2008/051501 filed Apr. 18, 2008.

BACKGROUND OF THE INVENTION

1. Field of the Invention

The present invention relates to a process and an apparatus for assembling tyres.

In more detail, the invention applies to the process and equipment used for building a green tyre, to be subsequently submitted to a vulcanisation cycle so as to obtain the final product.

2. Description of the Related Art

A tyre for vehicle wheels generally comprises a carcass structure including at least one carcass ply having respectively opposite end flaps in engagement with respective annular anchoring structures integrated into the regions usually identified with the name of "beads" and having an inner diameter substantially corresponding to a so-called "fitting diameter" of the tyre on a respective rim.

Associated with the carcass structure is a belt structure comprising one or more belt layers, arranged in radially superposed relationship relative to each other and to the carcass ply, provided with textile or metallic reinforcing cords having a crossed orientation and/or disposed substantially parallel to the circumferential extension direction of the tyre. At a radially external position to the belt structure, tread band is applied which is also of elastomeric material like other constituent semifinished products of the tyre.

Respective sidewalls of elastomeric material are further applied, at an axially external position, to the side surfaces of the carcass structure, each extending from one of the side edges of the tread band until close to the respective annular anchoring structure to the beads. In tyres of the "tubeless" type, an airtight coating layer usually referred to as "liner" covers the inner surfaces of the tyre.

Subsequently to building of the green tyre obtained through assembly of the respective components, a vulcanisation and moulding treatment is generally carried out which aims at determining structural stabilisation of the tyre through cross-linking of the elastomeric compounds as well as at impressing it with a desired pattern and with possible distinctive graphic marks at the sidewalls.

The carcass structure and belt structure are generally made separately from each other at respective work stations, to be mutually assembled at a second time.

In more detail, manufacture of the carcass structure first contemplates application of the carcass ply or plies onto a building drum, to form a so-called substantially cylindrical "carcass sleeve". The annular anchoring structures to the beads are fitted or formed on the opposite end flaps of the carcass ply or plies that are subsequently turned up around the annular structures so as to enclose them in a sort of loop.

A so-called "outer sleeve" is made on a second or auxiliary drum, said outer sleeve comprising the belt layers applied in radially superposed relationship with each other, and possibly the tread band applied at a radially external position to the belt layers. The outer sleeve is then picked up from the auxiliary drum to be coupled to the carcass sleeve. To this aim, the outer sleeve is disposed coaxially around the carcass sleeve and then the carcass ply or plies are shaped into a toroidal configuration, for example by mutual axial approaching of the beads and simultaneous admission of fluid under pressure into the carcass sleeve, so as to cause radial expansion of the carcass plies until adhesion of the latter against the inner surface of the outer sleeve.

Assembly of the carcass sleeve to the outer sleeve can be carried out on the same drum as used for making the carcass sleeve, in which case reference is made to a "unistage building process" or "unistage process".

Also known are building processes of the so-called "two-stage" type, in which a so-called "first-stage drum" is used for making the carcass sleeve, while assembly between carcass sleeve and outer sleeve is carried out on a so-called "second-stage drum" or "shaping drum" onto which the carcass sleeve picked up from the first-stage drum and subsequently the outer sleeve picked up from the auxiliary drum are transferred.

By the term "elementary semi-finished products" herein and in the following it is intended to denote continuous elongated elements of elastomeric material, textile and/or metallic rubberised cords, strip-like elements. It is to be pointed out that, to the aims of the present specification, by "strip-like element" it is intended a strip of elastomeric material cut to size, comprising one or more textile or metallic reinforcing cords. These elementary semi-finished products lend themselves to be used in an appropriate amount for composing one or more of the above described constituent elements of the tyre, without storage of semi-finished products being required.

EP 1 312 462 discloses a building system in which a ply feeding station, a carcass-building station, an assembly station and a belt building station provided with the respective drums are arranged along a production line. Transport members movable along the production line carry out transfer of the articles of manufacture under processing from a work station to another one, removing the article of manufacture from a drum and disposing it on the drum of the following station.

WO 2004/041521 in the name of the same Applicant discloses a building process in which a carcass sleeve is formed on a primary drum, while a belt structure is made on an auxiliary drum. A tread band is subsequently formed on the belt structure and afterwards the outer sleeve made up of belt structure and tread band is picked up from the auxiliary drum to be coupled to the carcass sleeve disposed on the primary drum. To this aim, a transfer ring places the outer sleeve to a coaxially centred position around the carcass sleeve, and the latter is shaped into a toroidal configuration so as to determine assembly of same with the outer sleeve.

EP 1 481 791 discloses a tyre production system comprising a plurality of carcass-building stations distributed to a predetermined mutual distance to form the carcass structures on respective carcass-building drums sequentially transferred along a carcass-building line. Along a belt production line, formation of the belt structures equipped with the tread band is provided on respective belt building drums sequentially moved between belt building stations distributed to a predetermined mutual distance. Carcasses and belts are mutually assembled inside a vulcanisation mould.

In WO 2006/064526 in the name of the same Applicant, a substantially cylindrical carcass sleeve is provided to be made in a building station, while in a finishing station an outer sleeve is formed which is substantially cylindrical too and comprises a tread band applied at a radially external position to a belt structure. Manufacture of the outer sleeve contemplates that in a first work position of the finishing station a first belt structure is formed on a first auxiliary drum, while in a second work position of the finishing station the tread band is applied to a second belt structure previously formed on a second auxiliary drum. The first auxiliary drum is then positioned to the second work position, while the second auxiliary drum is positioned in a grip position to be picked up by a transfer member to be transferred to a centred position around the carcass sleeve formed in the building station.

SUMMARY OF THE INVENTION

Within the above illustrated production processes, the Applicant has faced the problem of increasing the daily productivity for tyres different from each other in size and structure, while maintaining a high operating flexibility in the production process. More specifically, by "operating flexibility" in this context it is intended the possibility of using for every tyre different elementary semifinished products for each type of elastomeric material or each type of textile or metallic reinforcing cord.

The Applicant has ascertained that by carrying out building of the carcass sleeve and/or the outer sleeve respectively, in two or more work stations, each dedicated to accomplishment of specific working steps and individually adaptable to working of different types of tyres, a reduction in the time required for completing a work cycle can be achieved, and also the individual stations and therefore the plant as a whole can offer more adaptability to working of tyres of different types and sizes.

The Applicant has also perceived that for accomplishment of the above, it was necessary that the building drum and auxiliary drum could be suitably coupled to respective external transfer units capable of offering wide freedom of movement to said drums to control displacements of same at least between the different building lines designed for formation of the carcass sleeve and outer sleeve.

The Applicant has also become aware of the fact that for achievement of the above, the association of the outer sleeve with the carcass sleeve must be carried out in such a manner as to allow said transfer units to interact without hindering each other utilising an operating movement speed capable of maintaining a high productivity, while at the same time enabling the features of the tyre being processed to remain consistent with the design, by virtue of the geometric positioning of the aforesaid sleeves.

The Applicant has finally found that by providing an assembly station capable of receiving the building drum and the auxiliary drum from the external transfer units for retaining them in a predetermined orientation, observance of the daily productivity and technological flexibility is obtained while at the same time improving the quality of the finished product.

More particularly, the following features are achieved:
centring relative to a grip unit adapted to pick up the outer sleeve from the auxiliary drum so as to subsequently position it around the carcass sleeve carried by the building drum;
efficiency in the assembly operations between the carcass sleeve and outer sleeve.

More specifically, in a first aspect the present invention relates to a process for assembling tyres, comprising the steps of: forming a carcass sleeve on a building drum, which carcass sleeve comprises at least one carcass ply and a pair of annular anchoring structures; forming an outer sleeve on an auxiliary drum, said outer sleeve comprising at least one belt layer and a tread band; engaging the auxiliary drum on an assembly station; picking up the outer sleeve from the auxiliary drum; engaging the building drum on the assembly station; positioning the outer sleeve at a radially external position to the carcass sleeve formed on the building drum; coupling the carcass sleeve to said outer sleeve; removing the assembled tyre from the assembly station.

Therefore the process according to the invention allows green tyres to be obtained also using elementary semi-finished products different from each other in a plurality of working stations, an optimal repeatability of positioning and centring between carcass sleeve and outer sleeve being ensured even at high production speeds. Thus the desired levels of quality and production flexibility are obtained without the plants' productivity being impaired.

According to a further aspect, the present invention relates to an apparatus for assembling tyres, comprising: engagement devices to be coupled to an auxiliary drum carrying an outer sleeve comprising a belt structure and a tread band, and to a building drum carrying a carcass sleeve comprising at least one carcass ply and a pair of annular anchoring structures; a first transfer unit for connecting the auxiliary drum to the engagement devices; a second transfer unit for connecting the building drum to the engagement devices; a grip unit for picking up the outer sleeve from the auxiliary drum coupled to the engagement devices and positioning it to a location radially external to the carcass sleeve carried by the building drum coupled to the engagement devices.

The present invention in at least one of the above mentioned aspects, can have one or more of the preferred features hereinafter described.

The building drum is engaged on the assembly station before removing the auxiliary drum from the assembly station.

More preferably, said building drum is in axial-alignment relationship with the auxiliary drum.

An at least partial simultaneousness in the steps of loading the building and auxiliary drums allows achievement of an advantageous reduction in the times for carrying out the work cycle in the assembly station.

Removal of the tyre being processed from the assembly station comprises the steps of: engaging an unloading handling device on an outer surface of the tyre; translating the unloading handling device for axially removing the tyre from the building drum; translating said unloading handling device for moving the tyre away from the assembly station.

Since tyre removal relies on a specific unloading handling device, the assembly station becomes immediately available for carrying out a new work cycle, the down time between removal of the tyre from the building drum and moving away of the tyre from the assembly station being minimised or eliminated.

Preferably, engagement of the building drum in the assembly station takes place between a mandrel and a footstock operating on axially opposite ends of the building drum itself.

Engagement of the building drum can comprise the steps of: positioning the building drum in axial alignment between a mandrel and a footstock that are mutually spaced apart; engaging the building drum to the mandrel; axially moving the footstock close to the mandrel for engagement of the building drum between said mandrel and footstock.

Engagement of the auxiliary drum in the assembly station can comprise the steps of: positioning the auxiliary drum in axial alignment between a mandrel and a footstock that are mutually spaced apart; engaging the auxiliary drum with the footstock.

Thus important improvements are achieved in terms of reliability, accuracy and repeatability in positioning the carcass sleeve and the outer sleeve during the assembly step.

Engagement of the auxiliary drum with the footstock takes place by axial approaching of the auxiliary drum and the footstock.

During axial approaching of the auxiliary drum and the footstock, the auxiliary drum is axially inserted into a grip unit carried by the assembly station and designed to pick up the outer sleeve from the auxiliary drum.

Before positioning the auxiliary drum in axial alignment between said mutually spaced apart mandrel and footstock, the grip unit is axially positioned so as to be located at an axially centred position relative to the mid-line axis of the outer sleeve when coupling of the auxiliary drum to the footstock is completed.

The footstock can be set in rotation before engagement of the auxiliary drum, for angularly positioning at least one drive key carried by the footstock.

Preferably, said coupling step comprises: operatively coupling shaping devices carried by the assembly station to the building drum; shaping the carcass sleeve into a toroidal configuration for coupling it to said outer sleeve.

In fact the Applicant has found that an excellent quality of the product can be achieved by carrying out a perfect centring of the outer sleeve relative to the carcass sleeve and completing assembly therebetween without the carcass sleeve being removed from the building drum on which it was formed, due to use of shaping devices to be operatively coupled to the building drum in order to enable shaping of the carcass sleeve for coupling it to the outer sleeve.

Due to location of the shaping devices externally of the building drum, said building drum is lighter in weight and can be handled more easily, which as a result gives rise to less bulky and more reliable apparatus.

Picking up of the outer sleeve from the auxiliary drum comprises the steps of: translating a grip unit carried by the assembly station in parallel to a geometric rotation axis of the auxiliary drum until positioning the grip unit around the outer sleeve carried by the auxiliary drum; engaging the outer sleeve to the grip unit; axially translating the auxiliary drum for disengaging it from the outer sleeve.

The auxiliary drum is moved away from a condition of axial alignment with the grip unit, after picking up the outer sleeve from the auxiliary drum.

The step of positioning the outer sleeve at a location radially external to the carcass sleeve takes place through translation of the grip unit in parallel to a geometric rotation axis of the building drum until positioning the outer sleeve around the carcass sleeve.

Preferably, the step of operatively coupling the building drum to the shaping devices comprises engagement of a pair of retaining members with the building drum, each of said retaining members being in axially approached relationship with one half of the building drum.

More preferably, at least one of said retaining members acts against a circumferential abutment edge carried by the building drum.

Thus said retaining members can exert an efficient airtight action during inflation of the carcass sleeve and/or prevent the carcass plies from slipping off the annular anchoring structures, which brings about important advantages for accomplishment of the shaping step.

Preferably, the annular anchoring structures are locked relative to the building drum during the step of coupling the carcass sleeve to the outer sleeve.

More preferably, concurrently with said locking step, a hermetic seal of the carcass sleeve is carried out at the annular anchoring structures.

More particularly, at least one of said retaining members is brought into thrust relationship against said at least one annular anchoring structure.

Engagement of at least one of said retaining members with the building drum comprises the steps of: fastening a flanged element of the retaining member with respect to the building drum; pushing a sealing ring of the retaining member against said circumferential abutment edge.

Fastening of the flanged element ensures an efficient contrast action of the thrusts generated during the shaping step, by effect of fluid under pressure admitted to the inside of the carcass sleeve. In turn, due to the thrust of the sealing ring, locking of the carcass plies relative to the annular anchoring structures is ensured, also in the presence of plastic yielding of the elastomeric material.

Fastening of the flanged element preferably takes place through screwing down of a threaded member operating in a pressurisation chamber of a hydraulic brake carried by the flanged element and operating on a central shaft of the building drum.

The sealing ring is preferably pushed by circumferentially distributed sliding shoes which are movable in parallel to a geometric axis of the building drum.

After this step of coupling the carcass sleeve to the outer sleeve, the following steps are carried out: disengaging the grip unit from the assembled tyre; radially contracting the building drum; releasing the tyre being processed from the building drum.

Preferably, engagement of the building drum in the assembly station takes place between a mandrel and a footstock operating on axially opposite ends of the building drum, wherein said footstock is set in rotation for driving the building drum in rotation during a rolling step carried out after the step of coupling the carcass sleeve to the outer sleeve.

Preferably, at least part of said carcass sleeve is made by laying of elementary semifinished products on the building drum.

Said at least one belt layer can be formed by laying of elementary semifinished products on the auxiliary drum.

Said engagement devices comprise a mandrel and a footstock disposed coaxially opposite along an axis of mutual alignment.

Preferably, said mandrel and footstock can be moved close to each other along the axis of mutual alignment, starting from a condition of mutual distance in which said footstock and mandrel are mutually spaced apart by a greater amount than the sum of the axial bulkiness of said building drum and of said auxiliary drum.

Preferably said mandrel and footstock can be moved close to each other along said axis of mutual alignment, starting from a condition of mutual distance at which the mandrel is adapted to engage one end of the building drum carried by the second transfer unit while said footstock engages one end of the auxiliary drum carried by the first transfer unit.

It is thus possible to locate the building drum in alignment with the mandrel without removal of the auxiliary drum being required for creating room for the building drum.

The axial distance between footstock and mandrel in the condition at which they are mutually spaced apart can be of such an amount that the building drum connected to the mandrel is spaced apart from the auxiliary drum connected to the footstock by an axial amount greater than the axial bulkiness of the auxiliary drum.

Thus the auxiliary drum can be axially translated so as to remove it from the assembly station, without interfering with the building drum.

Said mandrel and footstock are mutually movable between said condition of mutual distance and a condition of mutual approaching at which they operate on opposite ends of the building drum.

Also provided is an unloading handling device for picking up a tyre being processed from the building drum and moving it away therefrom.

The unloading handling device is movable in parallel to a geometric rotation axis of the building drum for axially slipping the tyre off the building drum, and radially relative to said geometric rotation axis for moving the tyre away from said building drum.

Said footstock is drivable in rotation by a motor for angularly positioning a drive key that can be operatively engaged in at least one fitting seat carried by said auxiliary drum and/or said building drum.

Shaping devices can be operatively coupled to the building drum associated with the engagement devices for imposing a radial expansion to the carcass sleeve so as to couple it to the outer sleeve retained by the grip unit.

Preferably, each of said building drum and auxiliary drum comprises a central shaft carrying at least one grip end to be engaged by said engagement devices.

More preferably, the grip ends of the building drum and the auxiliary drum are shaped so as to be identical with each other.

Preferably said grip unit comprises: an annular structure movable in parallel to a geometric rotation axis of the building drum and the auxiliary drum on the engagement devices; a plurality of plates radially movable relative to the annular structure.

Preferably, the shaping devices comprise: an actuator operating on the building drum to axially approach the annular anchoring structures; inflating members to feed the carcass sleeve with working fluid during mutual approaching of the annular anchoring structures.

The shaping devices comprise retaining members acting in thrust relationship each against one of the annular anchoring structures in engagement with said at least one carcass ply.

Each of said retaining members can be operatively engaged with at least one connecting member carried by the building drum.

Each retaining member comprises at least one flanged element to be removably fastened to the building drum in axially approached relationship, and carrying at least one sealing ring designed to act against the respective annular anchoring structure.

Said flanged element is rotatably supported by a structure movable upon command of at least one actuator, for axially translating said retaining member. Each retaining member carries a fastening device to be operatively coupled to said at least one connecting member.

The fastening device comprises a brake operatively mounted on a guide sleeve to be slidably engaged on said at least one connecting member.

Preferably, said brake comprises: a threaded member sealingly engaged through said guide sleeve and having an end portion disposed within a pressurisation chamber; actuating devices for driving said threaded member in rotation.

Thus actuation of the brakes can be determined without the aid of rotary hydraulic couplings being required, which is advantageous in terms of structural simplification and operating reliability of the whole apparatus.

Each of said retaining members further comprises thrust devices operating on the sealing ring to push the latter towards the respective annular anchoring structure.

Thus an efficient hermetic seal and/or locking of the carcass ply/plies relative to the annular anchoring structures can be ensured, so that possible yielding of the raw elastomeric material forming the tyre being processed can be compensated for by the constant thrust of the sealing ring.

Said at least one sealing ring acts against the respective annular anchoring structure by a radially external frustoconical surface of the sealing ring itself.

Said at least one sealing ring is radially expandable upon the action of the thrust devices.

Said thrust devices comprise a thrust ring axially movable towards said at least one sealing ring upon the action of a fluid-operated actuator.

Said at least one fluid-operated actuator can comprise at least one sliding shoe operating against a radial counter surface acting on said at least one thrust ring.

Preferably, each retaining member comprises a plurality of sealing rings which are respectively concentric and of respectively different diameters.

Said radial counter surface is carried by a command ring simultaneously operating on a plurality of thrust rings each associated with one of said sealing rings.

Thus the shaping devices are suitable for working of a wide variety of tyres having fitting diameters different from each other.

Preferably, the sealing ring has a radially internal frustoconical surface facing a circumferential edge of the thrust ring.

In addition, rolling devices are preferably also provided and they are radially movable relative to the building drum associated with the engagement devices.

Preferably, an assembly station supplements said engagement devices, grip unit and first and second transfer units.

According to a further embodiment, an assembly station supplements said engagement devices, grip unit, first and second transfer units and shaping devices.

In a preferred embodiment, the apparatus further comprises: a carcass-building line to form at least one carcass sleeve on the building drum; an outer-sleeve building line to form at least one outer sleeve on the auxiliary drum; an assembly station to couple each carcass sleeve to each outer sleeve; wherein said first transfer unit bears the auxiliary drum at least from a work station in the outer-sleeve building line to the assembly station; wherein said second transfer unit bears the building drum at least from a work station in the carcass-building line to the assembly station.

Further features and advantages will become more apparent from the detailed description of a preferred, but not exclusive, embodiment of a process and an apparatus for manufacturing tyres, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
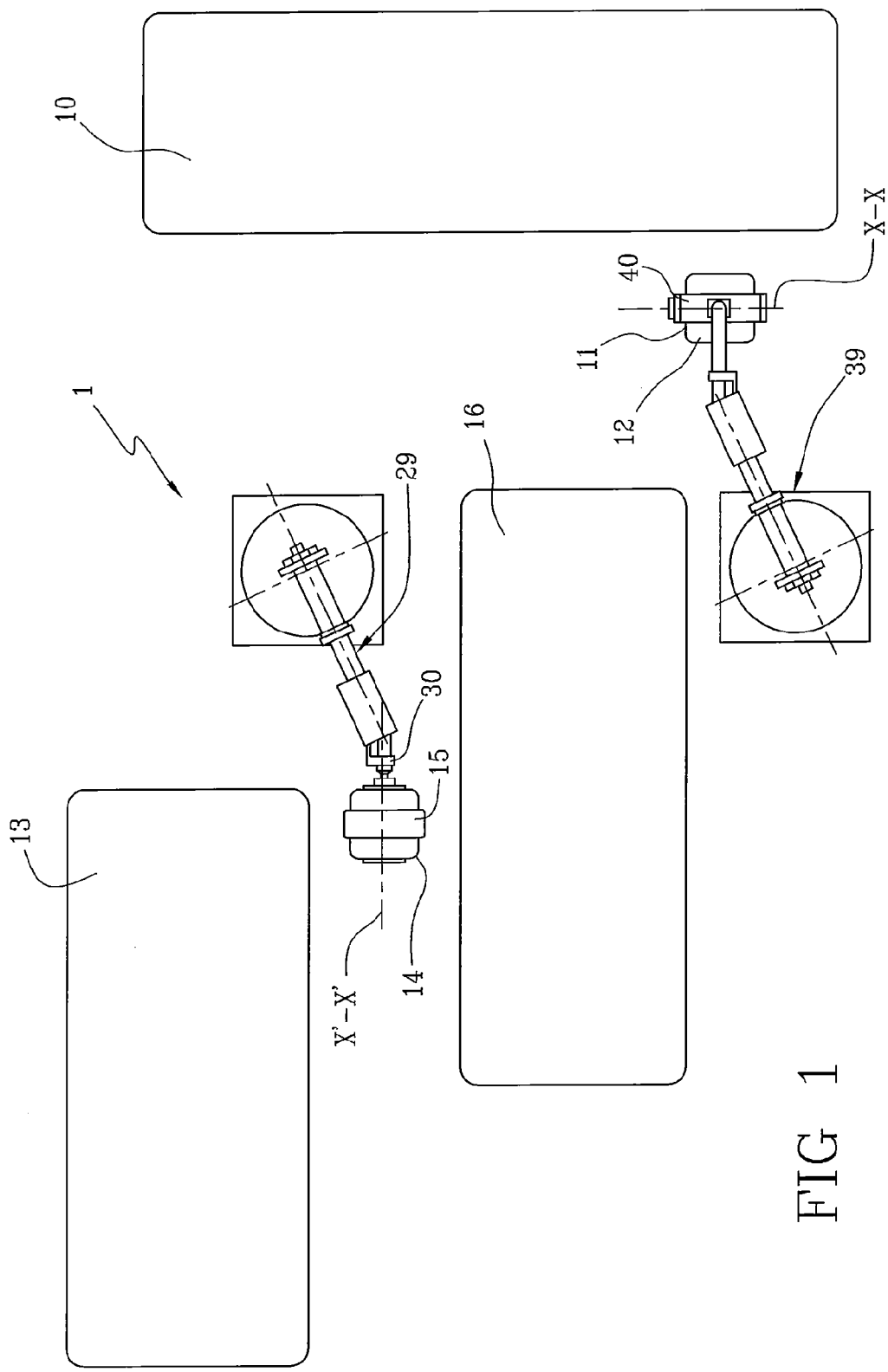
FIG. 1 is a diagrammatic top view of a plant for tyre production in accordance with the present invention.

With reference to the drawings, an apparatus for building tyres for vehicle wheels designed to put into practice a process in accordance with the present invention has been generally identified by reference numeral 1.

Figure 5:
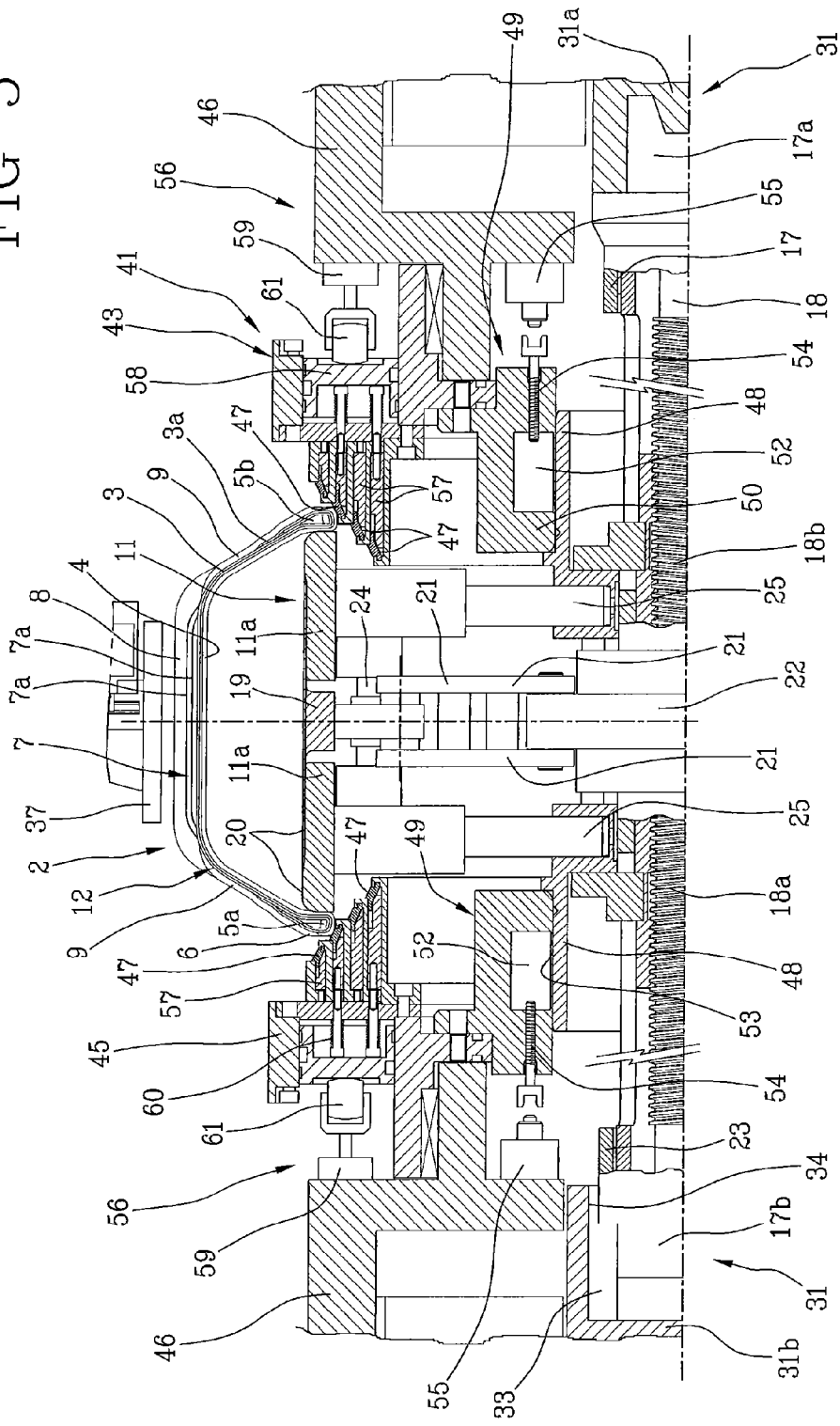
FIG. 5 shows a tyre being processed in the step during which the carcass sleeve is being shaped to be coupled to the outer sleeve.

Apparatus 1 is intended for manufacturing tyres 2 (FIG. 5) essentially comprising at least one carcass ply 3 preferably internally coated with a layer of airtight elastomeric material, or a so-called "liner" 4. Two annular anchoring structures 5 each comprising a so-called bead core 5a preferably carrying an elastomeric filler 5b at a radially external position, are in engagement with respective end flaps 3a of the carcass ply/plies 3. The annular anchoring structures 5 are integrated close to regions usually identified as "beads" 6, at which engagement between tyre 2 and a respective mounting rim (not shown) usually takes place, according to a fitting diameter determined by the inner diametrical sizes of the annular anchoring structures 5.

A belt structure 7 usually comprising one or more belt layers 7a is circumferentially applied around the carcass ply/plies 3, and a tread band 8 circumferentially overlaps the belt structure 7. Two sidewalls 9, each extending from the corresponding bead 6 to a corresponding side edge of the tread band 8, are applied at laterally opposite positions onto the carcass ply/plies 3.

In a preferred embodiment, diagrammatically shown by way of example in FIG. 1, apparatus 1 comprises a carcass-building line 10, at which one or more building drums 11 are sequentially moved between different work stations (not shown) designed to form a carcass sleeve 12 on each building drum 11, said carcass sleeve 12 comprising at least one carcass ply 3, liner 4, annular anchoring structures 5 and possibly at least part of the sidewalls 9. Simultaneously, in an outer-sleeve building line 13, one or more auxiliary drums 14 are sequentially moved between different work stations (not shown) designed to form an outer sleeve 15 on each auxiliary drum 14, which outer sleeve 15 comprises at least the belt structure 7, tread band 8, and possibly at least part of the sidewalls 9.

Figure 2:
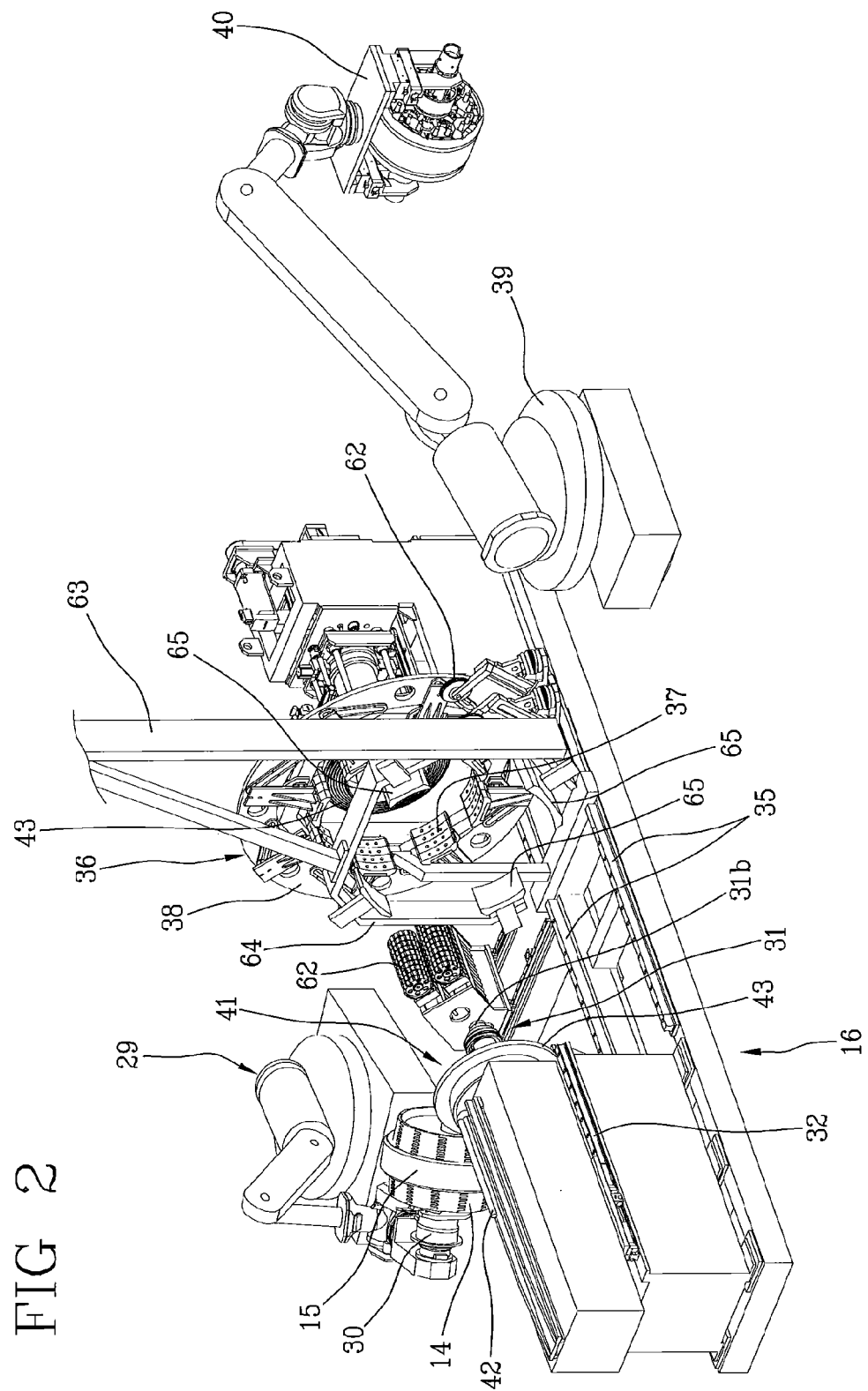
FIG. 2 is a perspective view of an assembly station being part of an apparatus in accordance with the invention.

Apparatus 1 further comprises an assembly station 16, better shown in FIG. 2, at which the outer sleeve 15 is removed from the auxiliary drum 14 to be coupled to the carcass sleeve 12 formed on the building drum 11.

In more detail, the building drum 11 has two halves 11a borne by a first central shaft 17 extending along a geometric axis X-X of the building drum. Halves 11a can be axially approached, upon command of a threaded bar 18 for example, which is operatively disposed within the first central shaft 17 and carries two threaded portions 18a, 18b, a right-handed portion and a left-handed portion respectively, each engaging one of halves 11a. Halves 11a of the building drum 11 are consequently induced to simultaneously translate in respectively opposite directions along the first central shaft 17, following rotations imparted to the threaded bar 18.

The building drum 11 can further comprise a central section 19 slidably engaging halves 11a and extending in a surface-continuity relationship relative to the same so as to define therewith, at a radially external position, a substantially continuous outer surface 20.

Each of halves 11a and the central section 19 are made up of respective circumferential sectors, radially movable members between a rest condition (not shown) at which they are disposed radially close to the geometric axis "X-X" to give the building drum 11 a diametrical bulkiness smaller than the fitting diameter of the tyre being processed, in order to allow removal of tyre 2 being processed from the building drum 11, and a work condition at which, as shown in the figures, they extend in circumferential continuity relationship so as to form said outer surface 20 having a diameter preferably greater than the fitting diameter.

In the embodiment shown, radial movement of the circumferential sectors is carried out through a plurality of connecting rods 21 each secured between one of the sectors of the central section 19 of the building drum 11 and a drive collar 22 rotatably carried by the first central shaft 17 and drivable in angular rotation by a tubular sleeve 23 housed within the first central shaft 17 itself. Transmission bars 24 axially extending through the sectors of the central section 19, transmit the radial movements of said sectors to the circumferential sectors of the axially opposite halves 11a of the building drum 11, slidably guided along respective columns 25 radially extending relative to the first central shaft 17.

The first central shaft 17 has a connecting terminal 17a that can be operatively engaged by at least one robotized arm or other transfer devices (not shown) adapted to sequentially move the building drum 11 between said work stations located along the carcass-building line 10.

At least one of the work stations located on the carcass-building line 10 can for example comprise one or more delivery devices feeding at least one continuous elongated element of elastomeric material while the building drum 11 is being driven in rotation around its geometric axis X-X, so as to form the above mentioned liner 4 on the outer surface 20 and/or on possible auxiliary support elements (not shown) that can be removably coupled in a continuity relationship with the outer surface itself, at locations axially opposite to the building drum 11. In addition or as an alternative to liner 4, abrasion-proof inserts to be incorporated at beads 6 can also be formed and/or, in case of tyres of the so-called run-flat type, auxiliary support inserts (referred to as sidewall inserts) which are applied to the respective halves 11a of the building drum 11, so as to be then incorporated into tyre 2 at the sidewall 9 region.

After formation of the above mentioned parts, application devices not shown as they can be made in any convenient manner, apply the carcass ply/plies 3 around the outer surface 20. Each carcass ply 3 can consist of an article of manufacture in the form of a continuous strip previously cut to the circumferential extension of the outer surface 20 and delivered towards the latter, while the building drum 11 is rotating about its geometric axis X-X, so as to cause winding of same around the outer surface 20.

In a preferred embodiment, at least the carcass ply/plies 3 and/or other parts of tyre 2 are made by laying of elementary semifinished products.

To this aim, the application devices preferably comprise members for sequentially applying a plurality of strip-like elements disposed transversely relative to the circumferential extension of the outer surface 20, while the building drum 11 is being driven in rotation with a stepping movement, in the same manner as described in document U.S. Pat. No. 6,328,084 for example, in the name of the same Applicant.

The carcass ply/plies 3 are then preferably directly formed on the building drum 11, by application of the strip-like elements in mutually approached relationship, so as to cover the whole circumferential extension of the outer surface 20.

Preferably, the outer surface 20 has an axial size smaller than the width of said at least one carcass ply 3, so that the end flaps 3a of the carcass ply/plies 3 disposed on the building drum 11 axially project from the opposite ends of the outer surface 20.

Locating members not shown as they can be made in a manner known by itself carry out fitting of each of the annular anchoring structures 5 coaxially around one of the end flaps 3a of the carcass ply/plies 3 folded over towards the geometric axis X-X, and placement of said structure in axial abutment relationship against the corresponding half of the building drum 11.

When placement has been completed, turning-up members turn each of the end flaps 3a around the respective annular anchoring structure 5, so as to stabilise engagement of same with the carcass ply/plies 3 thereby giving rise to formation of said carcass sleeve 12.

When engagement of the annular anchoring structures 5 has been completed or concurrently with this operating step, application of sidewalls 9 can take place.

Figure 3:
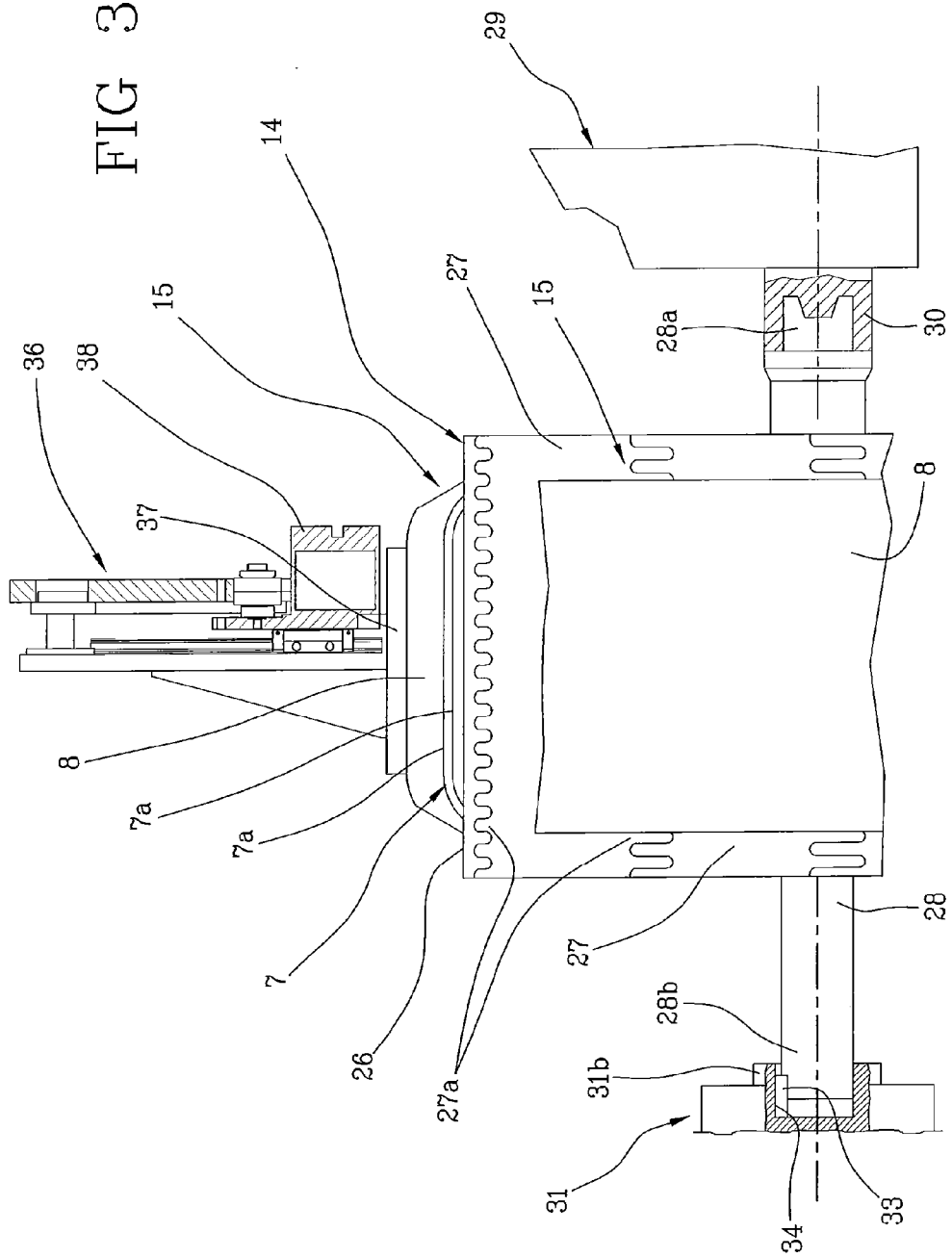
FIG. 3 diagrammatically shows in diametrical section, an outer sleeve in an engagement step of same by a grip unit associated with the assembly station.
Figure 4:
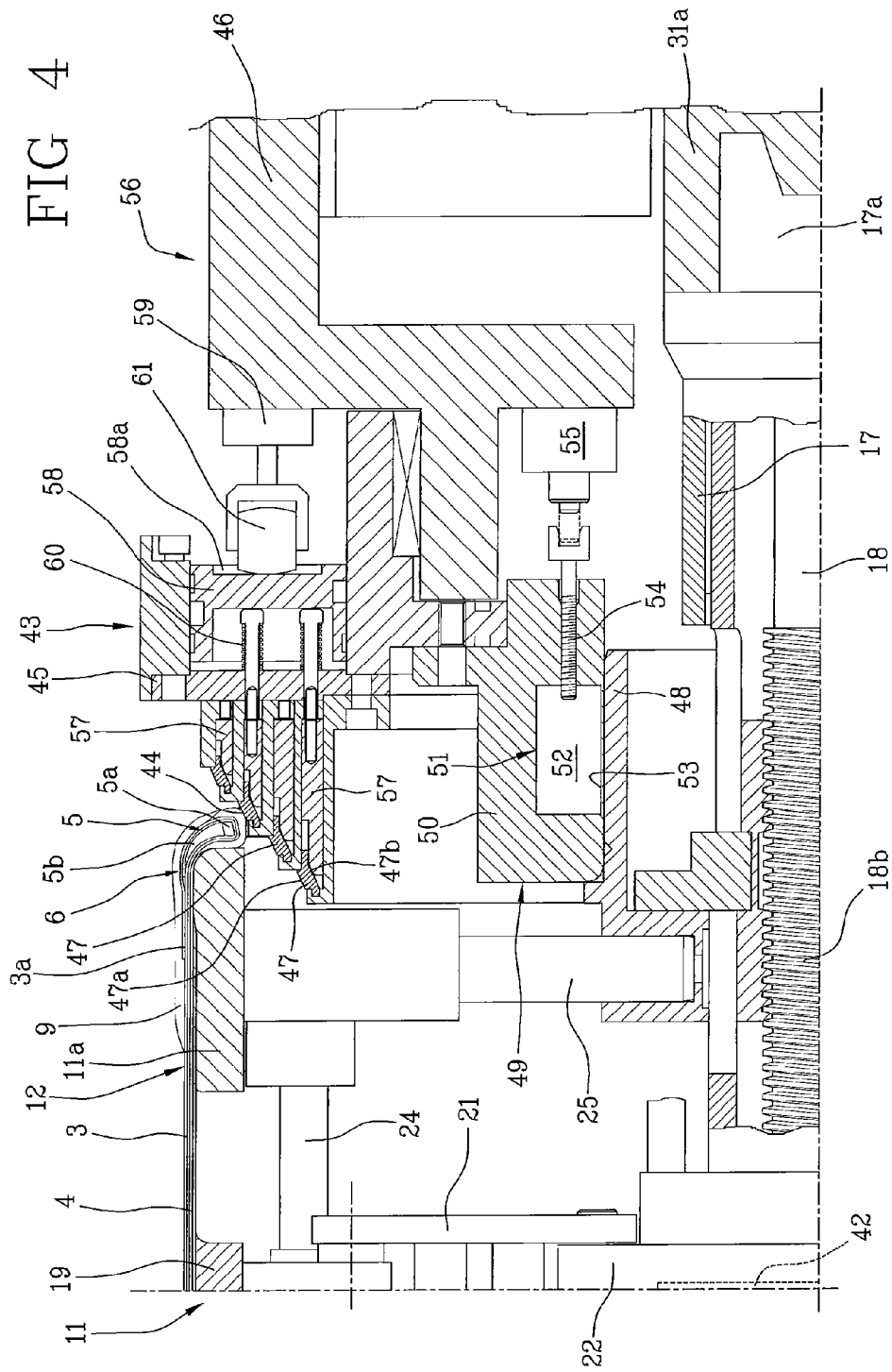
FIG. 4 diagrammatically shows in diametrical section, a carcass sleeve in an engagement step of the beads by retaining members associated with the assembly station.

As better shown in FIG. 3, the auxiliary drum 14 is externally provided with a substantially cylindrical laying surface 26 defined by a plurality of auxiliary sectors 27 disposed consecutively around a geometric symmetry axis X'-X' of the auxiliary drum. The auxiliary sectors 27 can be simultaneously submitted to radial translation upon command of adjustment devices, not shown, drivable through a second central shaft 28 carrying a respective connecting terminal 28a.

Preferably, each auxiliary sector 27 has comb-shaped end portions 27a each of which operatively engages a comb-shaped end portion 27a complementary thereto, carried by a circumferentially adjacent auxiliary sector 27.

Through at least one robotized arm or other handling devices operating on the connecting terminal 28a of the second central shaft 28, the auxiliary drum 14 is adapted to be moved and conveniently driven at different work stations located along the outer-sleeve building line 13.

Radial mobility of the auxiliary sectors 27 allows the diametrical sizes of the auxiliary drum 14 to be varied, starting from a minimum diameter until reaching a diameter suitable for manufacturing outer sleeves 15 in compliance with the design specifications. In the condition of minimum diameter, the auxiliary sectors 27 can act mutually in abutment by means of respective circumferential shoulders present thereon at the comb-shaped ends 27a, so as to give the laying surface 26 a continuous extension, adapted to allow formation of parts of elastomeric material of the outer sleeve 15, such as an under-belt insert, through laying of at least one continuous elongated element of elastomeric material wound up into consecutively-approached coils.

When manufacture of the under-belt insert has been completed, the auxiliary sectors 27 can be radially expanded until giving the laying surface 26, and the under-belt insert formed thereon, a diameter suitable for formation of the belt layers 7a and/or other parts of the outer sleeve 15. Due to the presence of the comb-shaped end portions 27a the laying surface 26 can keep its substantially cylindrical conformation and a substantially continuous extension, i.e. without the presence of important discontinuities, even after radial expansion of the auxiliary drum 14.

Due to the absence of important discontinuities on the laying surface 26, correct formation of the different parts of the outer sleeve 15 is facilitated, above all when, as provided by a preferred embodiment, at least the belt layer or layers 7a and/or other parts of the outer sleeve 15 are made by laying of strip-like elements or other elementary semi-finished products on the auxiliary drum 14.

When formation of the belt structure 7 is over, building of the tread band 8 takes place by means of delivery members supplying a continuous elongated elastomeric element applied in the form of coils disposed in side by side and/or radially superposed relationship on the belt structure 7 carried by the auxiliary drum 14, while the latter is being driven in rotation.

When building of the outer sleeve 15 has been completed a first transfer unit 29 carries out transfer of the auxiliary drum 14 to the assembly station 16.

This first transfer unit 29 preferably comprises a robotized arm, more preferably an anthropomorphous robot with six or more (preferably seven) movement axes, having a head 30 that can be operatively coupled to the connecting terminal 28a of the second central shaft 28. Preferably the first transfer unit 29 is also entrusted with the task of supporting the auxiliary drum 14 in the outer-sleeve building line 13, and conveniently moving it between at least the last work station provided along said line and said assembly station 16. Said first transfer unit 29 can also carry out operation of said devices for adjustment of the diameter of the laying surface 26.

Transfer of the auxiliary drum 14 to the assembly station 16 takes place through translation of the drum itself in a direction radial to its geometric rotation axis X'-X', so as to align it with engagement devices 31 installed on the assembly station itself.

The engagement devices 31 preferably comprise a mandrel 31a and a footstock 31b that are mutually opposite and in coaxial mutual alignment.

Mandrel 31a and footstock 31b can be mutually approached starting from a condition of mutual distance at which they are spaced apart from each other by a greater amount than the sum of the axial bulkiness of said building drum and auxiliary drum. To this end the footstock 31b can be provided to be translatable upon the action of devices not shown, along first slide guides 32 integral with the assembly station 16.

Footstock 31b may be also provided to be drivable in rotation by a respective motor not shown, to set angular positioning of at least one drive key 33 in accordance with angular positioning of a corresponding fitting seat 34 offered by a grip end 28b of the second central shaft 28. The aforesaid setting can be completed before or concurrently with axial alignment of the auxiliary drum between footstock 31b and mandrel 31a disposed in their position of mutual distance.

By an axial movement of the auxiliary drum 14 the grip end 28b of the second central shaft 28 is coupled to the footstock 31b, while the connecting terminal 28a placed on the opposite side from the grip end 28b is still retained by the first transfer unit 29.

In this way the auxiliary drum 14, that has been hitherto borne by a system offering freedom of movement according to six or more axes and represented by the first transfer unit 29, is efficiently immobilised in a unique and precise positioning within the assembly station 16.

In more detail, by said axial movement the auxiliary drum 14 is also coaxially fitted into a grip unit 36 adapted to pick up the outer sleeve 15 from the auxiliary drum 14, by a plurality of circumferentially distributed plates 37 that are radially movable relative to an annular support structure 38 axially movable along respective second guides 35 integral with the assembly station 16.

Before positioning the auxiliary drum 14 in axial alignment between mandrel 31a and footstock 31b which are mutually spaced apart in the assembly station 16, a pre-setting of the axial positioning of the grip unit 36 can be carried out. To this aim, the annular support structure 38 is axially positioned along the second guides 35 in such a manner that plates 37 are already located at an axially centred position relative to the mid-line axis of the outer sleeve 15 when coupling of the auxiliary drum 14 with the footstock 31b is completed. Plates 37 are then simultaneously radially approached relative to the auxiliary drum, until they come into contact with the outer sleeve 15.

Suitable actuators housed in the head 30 operate radial contraction of the auxiliary sectors 27, through the connecting terminal 28a of the second central shaft 28, so as to disengage the auxiliary drum 14 from the outer sleeve 15 retained by plates 33 of the grip unit 36.

Then by the first transfer unit 29 the auxiliary drum 14 is axially slipped off the outer sleeve 15 that remains in engagement with the grip unit 36, and thereafter the auxiliary drum 14 can be radially moved apart from its axial alignment condition with the grip unit 36 to be used again for manufacturing a new outer sleeve 15 in the outer-sleeve building line 13.

A second transfer unit 39, comprising a robotized arm for example, which carries a fork-shaped terminal 40 to be operatively coupled to the opposite ends of the first central shaft 17, receives the building drum 11 from the carcass-building line 10 for associating it with the engagement devices 31.

The second transfer unit 39 itself can also be entrusted with the task of supporting the building drum 11 in the carcass-building line 13, and conveniently moving it between at least the last work station provided along the carcass-building line 10 itself and the assembly station 16.

Transfer of the building drum 11 to the assembly station 16 takes place through translation of the drum in a radial direction relative to its geometric rotation axis X-X, so as to align it between mandrel 31a and footstock 31b, disposed in the condition of mutual distance.

When alignment has been completed, a short axial movement of the building drum 1 or the mandrel 31a causes engagement of the latter with a connecting terminal 17a of the first central shaft 17.

Advantageously, axial alignment of the building drum 11 in the assembly station 16 can be carried out when the auxiliary drum 14 has not yet been removed from the assembly station itself. In the condition of mutual distance, the axial distance between footstock 31b and mandrel 31a in fact is of such a magnitude that mandrel 31a is adapted to engage the connecting terminal 17a of the building drum 11 carried by the second transfer unit 39, while the footstock 31b engages the grip end 28b of the auxiliary drum 14 carried by the first transfer unit 29. The grip unit 36 too is already positioned out of the movement region of the building drum 11, so that it does not hinder introduction of the latter into the assembly station 16.

Preferably, the axial distance between footstock 31b and mandrel 31a in the condition of mutual distance is also of such a nature that the building drum 11 connected to mandrel 31a is spaced apart from the auxiliary drum 14 connected to the footstock 31b by an axial amount greater than the axial bulkiness of the auxiliary drum 14 itself. This condition enables the auxiliary drum 14 to be axially slipped off the grip unit 36, without causing interferences with the building drum 11 already connected to mandrel 31a.

Thus all downtimes in working are eliminated, which is advantageous for reducing the floor to floor times because the building drum 11 can be positioned in the assembly station 16 without being it necessary to wait for removal of the auxiliary drum 14 and/or movement of the grip unit 36 carrying the outer sleeve 15.

When engagement of the building drum 11 with mandrel 31a has occurred, the footstock 31b is axially moved close to the building drum 11 itself for engaging one grip end 17b of the first central shaft 17, on the opposite side from mandrel 31a. The fork-shaped terminal 40 of the second transfer unit 39 can be then released from the building drum 11 and moved away from the assembly station 16.

The building drum 11 is now efficiently held up between mandrel 31a and footstock 31b in a mutually approached condition, in a unique and precise positioning (more specifically to one degree of freedom: rotation relative to axis X-X) within the assembly station 16, in axially aligned relationship with the grip unit 36 carrying the outer sleeve 15.

Use of the same engagement devices 31 for engaging both the auxiliary drum 14 and the building drum 11 in the assembly station 16 promotes an excellent unique and repeatable positioning of the articles of manufacture being processed within the assembly station itself. To this aim, the grip ends 17b, 28b, and preferably also the connecting terminals 17a, 28a of the building drum 11 and the auxiliary drum 14 are to be preferably shaped so as to be identical with each other.

By movement of the grip unit 36 along the second guides 35, in parallel to the geometric rotation axis X-X of the building drum 11, the outer sleeve 15 is placed at an axially centred position relative to the mid-line axis of the carcass sleeve 12 carried by the building drum 11 itself.

Shaping devices 41 installed on the assembly station 16 are then operatively coupled to the building drum 11 so as to shape the carcass sleeve 12 into a toroidal configuration (FIG. 5), in order to cause application of same against a radially internal surface of the outer sleeve 15, thus carrying out the step of coupling said carcass sleeve 12 to the outer sleeve 15.

The shaping devices 41 may for example comprise an actuator (not shown) operatively associated with mandrel 31a for driving the threaded bar 18 in rotation so as to cause mutual axial approaching of halves 11a of the building drum 11 and, consequently, of the annular anchoring structures 5 of the carcass sleeve 12. Preferably, the shaping devices 41 further comprise inflating members having a pneumatic circuit connected to at least one feeding duct 42 at least partly formed in the building drum 11 and for example opening along the first central shaft 17 to feed the carcass sleeve 12 with a working fluid and cause radial expansion of same by inflation, during mutual approaching of the annular anchoring structures 5.

Then operative engagement of the building drum 11 takes place with at least one retaining member 43 adapted to be integrated with the shaping devices 41 to enable execution of the step of shaping the carcass sleeve 12. In more detail, in a preferred embodiment, the building drum 11 is operatively engaged with at least one pair of retaining members 43, each in axially approached relationship with one of said halves 11a. The retaining members 43 are adapted to act each against a circumferential abutment edge 44 carried by the building drum 11, to enable toroidal conformation of the carcass ply/plies 3 concurrently with mutual approaching of halves 11a.

In more detail, each retaining member 43 is adapted to act in thrust relationship against one of the annular anchoring structures 5 each defining one of said circumferential abutment edges 44 to keep beads 6 against the building drum 11 and/or lock the carcass ply/plies 3 relative to the annular anchoring structures 5 during the shaping step, so as to avoid undesirable creeping of the carcass ply/plies or any other undesirable deformation in the region of beads 6 during radial expansion of the carcass sleeve 12.

Each retaining member 43 preferably comprises at least one flanged element 45 rotatably supported by a movable structure 46 that, upon command of at least one electric or fluid-operated actuator not shown in the figures, causes axial translation of the retaining member 43 relative to the building drum 11.

The flanged element 45 can be removably fastened, in axially approached relationship, to the respective half 11a of the building drum 11 and carries at least one sealing ring 47 designed to act against the respective annular anchoring structure 5 carried by the building drum 11.

More particularly, a plurality of respectively concentric sealing rings 47 having respectively different diameters can be advantageously associated with each retaining member 43. Thus it is advantageously possible to use the same retaining members 43 for processing a wide variety of tyres having different fitting diameters.

The retaining members 43 can be removably coupled to respective connecting members 48 of the building drum 11, by a fastening device 49 operatively carried by the flanged element 45. This fastening device 49 preferably comprises a guide sleeve 50 to be slidably engaged on the respective connecting member 48 and with which a brake 51 is integrated.

To this aim, each brake 51 preferably comprises a pressurisation chamber 52 formed inside the guide sleeve 50 and circumscribing a radially deformable locking collar 53. The locking collar 53, for example made in the form of a membrane of elastically deformable material and/or comprising circumferentially distributed radially movable elements, radially faces the inside of the guide sleeve 50 and can be coaxially fitted around the connecting member 48. At least one threaded member 54 is operatively and sealingly in engagement through the guide sleeve 50, which threaded member 54 has an end portion disposed inside the pressurisation chamber 52.

Actuating devices 55, consisting of rotary actuators carried by the movable structure 46 for example, can be operatively coupled to the threaded member 54, to drive it in rotation after engagement of the flanged element 45 on the respective connecting member 48.

When the retaining members are fitted each on the respective connecting member 48 and axially shifted until bringing one of the respective sealing rings 47 against the annular anchoring structure 5 of the carcass sleeve 12, angular positioning of the threaded members 54 for operating brakes 51 can be easily controlled, if required, by angular rotation of the building drum 11 upon command of the mandrel 31a and/or the footstock 31b, so as do determine axial alignment between the threaded members 54 and the respective actuators and enable activation of brakes 51 in order to determine a steady axial anchoring of the retaining members 43 relative to the building drum 11.

Preferably, each sealing ring 47 acts against the respective annular anchoring structure 5 by a radially external frustoconical surface 47a of the sealing ring 47 itself. The sealing ring 47 can thus exert a thrust action against the carcass ply/plies 3 turned up around the annular anchoring structure 5, which thrust action is concentrated along a radially internal circumferential edge of said annular anchoring structure 5. Said thrust action appears to be particularly adapted to avoid undesirable creeping of the cords forming the carcass ply/plies 3 by effect of stresses transmitted during the shaping step.

At the same time, the sealing rings 47 preferably having a continuous circumferential extension, perform the function of sealingly closing the carcass sleeve 12 at the annular anchoring structures 5, facilitating radial expansion of the carcass sleeve and maintenance of the inflated condition following the shaping step.

The Applicant has further noticed that the thrust action exerted by the sealing rings 47 could however decrease during the shaping step, due to typical yielding of the raw elastomeric material.

Therefore, it is preferably provided that each retaining member 43 should further comprise thrust devices 56 operating between the respective flanged element 45 and the sealing rings 47 to enable the sealing ring 47 acting against the respective anchoring structure 5 to be maintained in thrust relationship against the latter during the whole shaping step of the carcass sleeve 12. In this manner, arising of creep phenomena of the cords of the carcass ply/plies 3 turned up around the annular anchoring structures 5 are avoided also in the presence of plastic yielding of the elastomeric material disposed close to beads 6.

According to a preferred embodiment, the thrust devices 56 comprise at least one thrust ring 57 slidably in engagement with the flanged element 45 and axially movable towards the sealing ring 47.

More particularly, a plurality of thrust rings 57 each of them associated with one of the sealing rings 47 is preferably provided. Each sealing ring 47 is radially expandable by effect of axial movement of the respective thrust ring 57. To facilitate this radial expansion, each sealing ring 47 can have a radially internal frustoconical surface 47b facing a circumferential edge of the thrust ring 57, so as to facilitate radial expansion.

Advantageously, a single command ring 58 axially guided in flange 45 and pushed by circumferentially-distributed fluid-operated actuators 59 can simultaneously operate on all thrust rings 57 associated with the respective retaining member 43, overcoming the action of respective return springs 60. The thrust action however will only act on the sealing ring 47 operating in abutment against the annular anchoring structure 5.

Preferably, at least three fluid-operated actuators 59 are provided and they are fastened to the movable structure 46 and axially operating by means of respective sliding shoes 61 against a radial counter-surface 58a of the thrust ring 57. Each sliding shoe 61 can comprise at least one roller rotatably supported by the fluid-operated actuator 59, along an axis radial to the rotation axis of the building drum 11.

In conclusion, during the whole shaping step, the action of brakes 51 on the respective connecting members 48 ensures steady positioning of the retaining members 43, and efficiently counteracts the important stresses tending to axially move them away from the building drum 11, by effect of the inflating pressure created within the carcass sleeve 12. At the same time, the thrust devices 56 make sure that, in spite of the axial locking carried out by brakes 51, the sealing rings 47 are constantly maintained in thrust relationship against the annular anchoring structures 5, also in the presence of plastic yielding of the elastomeric material.

In addition, rolling devices 62 radially movable relative to the building drum 11 can be also associated with the assembly station 16. In known manner, the rolling devices 62 after release of the grip unit 36 from the assembled tyre, carry out a rolling operation on the tread band 8 and on at least part of sidewalls 9 while the tyre being processed is being driven in rotation by a motor (not shown) associated with mandrel 31a, to ensure a reliable application of the outer sleeve 15 to the carcass sleeve 12. The footstock 31b too can be driven in rotation by the respective motor, to help in setting in rotation the building drum 11 through the drive key 33.

When the rolling step is over, brakes 51 can be deactivated to allow a the retaining members 43 to be slipped off the building drum 11.

As far as the retaining members 43 are steadily fastened relative to the building drum 11 by effect of brakes 51, there is a unique correlation between the angular positioning of the threaded members 54 and that of the drive key present on the footstock 31b, and/or similar device carried by mandrel 31a. This correlation can be utilised for stopping rotation of the building drum 11 when the threaded members 54 are in alignment with the respective actuating devices 55 also when rotation of the building drum 11 is being stopped at the end of the processing operations, so as to ensure deactivation of brakes 51 and axial moving apart of the retaining members from the building drum.

Advantageously, the threaded members 54 will be already aligned with the respective actuating devices 55 at the beginning of a new operating cycle.

When building has been completed, the sectors of the building drum 11 are radially contracted towards the inside to enable removal of tyre 2 from the building drum 11, upon the action of an unloading handling device 63 by which the tyre is moved away from the assembly station 16 and transferred to a vulcanisation station and/or other work stations provided in the production cycle. Preferably, the unloading handling device 63 comprises a U-shaped structure 64 that is movable in at least two axes, i.e. in a radial direction and a direction parallel to the geometric axis X-X of the building drum 11. By a radial movement for approaching the building drum 11, the U-shaped structure 64 will be located around the assembled tyre so as to engage it on an outer surface thereof, by means of radially movable auxiliary plates 65, for example. The U-shaped structure 64 is then shifted in parallel to the rotation axis of the building drum 11, to axially remove the tyre therefrom. By a new translation of the U-shaped structure 64, tyre 2 is moved away from the assembly station 16. Immediately after moving apart of the built tyre 2, a new work cycle can start, by introduction of the auxiliary drum 14 in axial alignment between mandrel 31a and footstock 31b.

The invention claimed is:

1. A process for assembling tyres, comprising:
    forming a carcass sleeve on a building drum, said carcass sleeve comprising a carcass ply attached to a pair of annular anchoring structures;
    forming an outer sleeve on an auxiliary drum, said outer sleeve comprising at least one belt layer and a tread band;
    using a first transfer unit, in the form of a first robotic arm with at least six movement axes, on the auxiliary drum for moving the auxiliary drum carrying the outer sleeve formed thereon to an assembly station;
    picking up the outer sleeve from the auxiliary drum while the auxiliary drum is held by the first transfer unit at one axial end of the auxiliary drum, coaxially with a footstock of the assembly station at the other axial end of the auxiliary drum;
    using a second transfer unit, in the form of a second robotic arm having at least six movement axes, for moving the building drum carrying the carcass sleeve formed thereon to the assembly station;
    engaging the building drum carrying the carcass sleeve formed thereon to the footstock and a mandrel at the assembly station;
    positioning the outer sleeve at a location radially external to the carcass sleeve formed on the building drum while the building drum is held in the assembly station by the mandrel at one axial end of the building drum and the footstock at the other axial end of the building drum;
    coupling the carcass sleeve to said outer sleeve; and
    removing the assembled tyre from the assembly station.

2. The process as claimed in claim 1, further comprising removing the auxiliary drum from the assembly station; and
    wherein the building drum is engaged to the mandrel before removing the auxiliary drum from the assembly station.

3. The process as claimed in claim 1, wherein removal of the assembled tyre from the assembly station comprises:
    engaging an unloading handling device on an outer surface of the tyre;
    translating the unloading handling device for axially removing the tyre from the building drum; and
    translating said unloading handling device for moving the tyre away from the assembly station.

4. The process as claimed in claim 1, further comprising positioning the building drum in axial alignment between the mandrel and the footstock while they are mutually spaced apart; and
    axially moving the footstock close to the mandrel before engaging the building drum to both of said mandrel and said footstock.

5. The process as claimed in claim 1, further comprising engaging the auxiliary drum to the footstock by axially moving the auxiliary drum close to the footstock.

6. The process as claimed in claim 5, wherein during axial moving of the auxiliary drum close to the footstock, the auxiliary drum is axially inserted into a grip unit carried by the assembly station and designed to pick up the outer sleeve from the auxiliary drum.

7. The process as claimed in claim 6, wherein before moving the auxiliary drum close to the footstock, the grip unit is axially positioned so as to be located at an axially centered position relative to axial ends of the outer sleeve when engaging of the auxiliary drum to the footstock is completed.

8. The process as claimed in claim 1, wherein said coupling the carcass sleeve to said outer sleeve comprises:
    operatively coupling shaping devices carried by the assembly station to the building drum; and
    shaping the carcass sleeve into a toroidal configuration for coupling said carcass sleeve to said outer sleeve.

9. The process as claimed in claim 1, wherein picking up of the outer sleeve from the auxiliary drum comprises:
    translating a grip unit carried by the assembly station in parallel to a geometric rotation axis of the auxiliary drum until positioning the grip unit around the outer sleeve carried by the auxiliary drum;
    engaging the outer sleeve to the grip unit; and
    axially translating the auxiliary drum for releasing said auxiliary drum from the outer sleeve.

10. The process as claimed in claim 9, further comprising moving the auxiliary drum away from a condition of axial alignment with the grip unit after picking up the outer sleeve from the auxiliary drum.

11. The process as claimed in claim 6, wherein positioning the outer sleeve at a location radially external to the carcass sleeve takes place through translation of the grip unit in parallel to a geometric rotation axis of the building drum until positioning the outer sleeve around the carcass sleeve.

12. The process as claimed in claim 8, wherein operatively coupling the building drum to the shaping devices comprises engagement of a pair of retaining members with the building drum, each of said retaining members being in axially approached relationship with a respective half of the building drum.

13. The process as claimed in claim 12, wherein each of said retaining members acts against a respective circumferential abutment edge carried by the building drum.

14. The process as claimed in claim 8, comprising locking the annular anchoring structures relative to the building drum during coupling of the carcass sleeve to the outer sleeve.

15. The process as claimed in claim 14, wherein concurrently with said locking, hermetically sealing the carcass sleeve at the annular anchoring structures.

16. The process as claimed in claim 12, wherein each of said retaining members is brought into thrust relationship against a respective annular anchoring structure of said pair of annular anchoring structures.

17. The process as claimed in claim 13, wherein engagement of each of said retaining members with the building drum comprises:
   fastening a respective flanged element of the each retaining member relative to the building drum; and
   pushing a respective sealing ring of the each retaining member against its respective circumferential abutment edge.

18. The process as claimed in claim 17, wherein fastening of each flanged element takes place through screwing down of a respective threaded member operating in a respective pressurisation chamber of a respective hydraulic brake carried by each flanged element and operating on a central shaft of the building drum.

19. The process as claimed in claim 17, wherein each sealing ring is pushed by respective circumferentially distributed sliding shoes which are movable in parallel with a geometric rotation axis of the building drum.

20. The process as claimed in claim 9, comprising, after coupling the carcass sleeve to the outer sleeve:
   disengaging the grip unit from the assembled tyre;
   radially contracting the building drum; and
   releasing the tyre being processed from the building drum.

21. The process as claimed in claim 8, wherein said footstock is set in rotation for driving the building drum in rotation during rolling thereof after coupling the carcass sleeve to the outer sleeve.

22. The process as claimed in claim 1, wherein said carcass ply is made by laying of elementary semifinished products on the building drum.

23. The process as claimed in claim 1, wherein said at least one belt layer is made by laying of elementary semifinished products on the auxiliary drum.

24. The process as claimed in claim 5, wherein said footstock is driven in rotation before engagement of the auxiliary drum for angularly positioning at least one drive key carried by the footstock.

\* \* \* \* \*